(12) United States Patent
Gao et al.

(10) Patent No.: US 12,323,906 B2
(45) Date of Patent: Jun. 3, 2025

(54) CONFIGURING ACCESS CONTROL PARAMETERS IN WIRELESS COMMUNICATIONS

(71) Applicant: ZTE Corporation, Guangdong (CN)

(72) Inventors: Yuan Gao, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 363 days.

(21) Appl. No.: 17/836,292

(22) Filed: Jun. 9, 2022

(65) Prior Publication Data

US 2022/0303883 A1   Sep. 22, 2022

Related U.S. Application Data

(63) Continuation of application No. PCT/CN2020/083913, filed on Apr. 9, 2020.

(51) Int. Cl.
*H04W 48/16* (2009.01)

(52) U.S. Cl.
CPC .................. *H04W 48/16* (2013.01)

(58) Field of Classification Search
CPC ..................................... H04W 48/16
USPC ......................................... 455/434
See application file for complete search history.

(56) References Cited

U.S. PATENT DOCUMENTS

| | | | |
|---|---|---|---|
| 2019/0150061 A1* | 5/2019 | Ishii | H04W 48/06 370/329 |
| 2019/0159108 A1 | 5/2019 | Lee et al. | |
| 2019/0174395 A1 | 6/2019 | Choe et al. | |
| 2019/0357119 A1* | 11/2019 | Hong | H04L 1/1614 |

FOREIGN PATENT DOCUMENTS

| | | |
|---|---|---|
| CN | 109548077 A | 3/2019 |
| CN | 110475312 A | 11/2019 |
| CN | 110505672 A | 11/2019 |

OTHER PUBLICATIONS

Office Action for Canadian Patent Application No. 3,164,078, mailed Oct. 17, 2023 (4 pages).
First Examination Report for Indian Patent Application No. 202247032812, mailed Nov. 30, 2023 (3 pages).
LG Electronics, "Unified Access Control," 3GPP TSG-SA WG1 Meeting #79, Guilin, China, S1-173082, Aug. 2017 (5 pages).
International Search Report and Written Opinion for International Patent Application No. PCT/CN2020/083913, mailed Dec. 30, 2020 (8 pages).

(Continued)

*Primary Examiner* — Michael R Neff
(74) *Attorney, Agent, or Firm* — Perkins Coie LLP

(57) ABSTRACT

The present application relates to methods, systems, and devices related to digital wireless communication, and more specifically, to techniques related to providing UAC parameters to a UE capable of performing a barring check based on the received parameters. A method for wireless communication can include receiving, by a wireless node, a first message that includes a set of access control parameters from a network node. The method can also include performing, by the wireless node, a barring check to determine whether a certain access attempt is allowed using the set of access control parameters.

12 Claims, 4 Drawing Sheets

(56) References Cited

OTHER PUBLICATIONS

Spreadtrum Communications, "Barring information signalling for SG unified access control," 3GPP TSG-RAN WG2 Meeting #101bis, R2-1804476, Sanya, China, Apr. 16-20, 2018 (7 pages).
3GPP, "3rd Generation Partnership Project; Technical Specification Group Radio Access Network; NR; Radio Resource Control (RRC) protocol specification (Release 16)," 3GPP TS 38.331 V16.0.0 (Mar. 2020).
Extended European Search Report for European Patent Application No. 20897376.8, mailed Jun. 16, 2023 (13 pages).

* cited by examiner

CONFIGURING ACCESS CONTROL PARAMETERS IN WIRELESS COMMUNICATIONS

CROSS REFERENCE TO RELATED APPLICATIONS

This patent document is a continuation of and claims benefit of priority to International Patent Application No. PCT/CN2020/083913, filed on Apr. 9, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to providing UAC parameters to a UE capable of performing a barring check based on the received parameters.

In one exemplary aspect, a method for wireless communication is disclosed. The method includes receiving, by a wireless node, a first message that includes a set of access control parameters from a network node. The method also includes performing, by the wireless node, a barring check to determine whether a certain access attempt is allowed using the set of access control parameters.

In another exemplary aspect, a method for wireless communication is disclosed. The method includes transmitting, by a network node, a first message that includes a set of access control parameters to a wireless node. The method also includes receiving, by the network node, a second message from the wireless node, the second message transmitted by the wireless node based on a result of a barring check performed by the wireless node to determine whether a certain access attempt is allowed using the set of access control parameters.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: receiving, by a wireless node, a first message that includes a set of access control parameters from a network node; and performing, by the wireless node, a barring check to determine whether a certain access attempt is allowed using the set of access control parameters.

2. The solution of clause 1, wherein the set of access control parameters include UAC parameters that include barring information representative of a listing of access categories with an associated barring information set that is configured for a specific network.

3. The solution of clause 1, wherein the set of access control parameters are configured for a data transmission service in an inactive state and/or an idle state.

4. The solution of any of clauses 1 and 3, wherein the data transmission service in the inactive state and/or the idle state is categorized as access category 7, wherein the wireless node performs the barring check using the set of access control parameters associated with the access category 7.

5. The solution of any of clauses 1 and 3, wherein the data transmission service in the inactive state and/or the idle state is categorized as a new access category, wherein the wireless node performs the barring check using the set of access control parameters associated with the new access category.

6. The solution of any of clauses 1 and 3, wherein the set of access control parameters include a bit indicative of whether the data transmission in the inactive state and/or the idle state is allowed, wherein the wireless node initiates data transmission in the inactive state and/or the idle state when the bit indicates the service is allowed.

7. The solution of any of clauses 1 and 3, wherein the data transmission service in the inactive state and/or the idle state is supported by the network node, and wherein the wireless node initiates the small data transmission service without performing the barring check.

8. The solution of any of clauses 1 and 2, wherein the UAC parameters that include barring information representative of assistance information for access category selection are provided together with an associated network index.

9. The solution of any of clauses 1 and 2, wherein the UAC parameters that include barring information representative of assistance information for access category selection are provided together with a bitmap.

10. The solution of clause 9, wherein a size of the bitmap equals a number of networks sharing a cell, wherein a first bit indicates whether a first network of the number of networks sharing the cell are associated with the barring information representative of the assistance information for access category selection that is configured for the specific network.

11. The solution of any of clauses 1 and 2, wherein the UAC parameters that include barring information representative of the assistance information for access category selection that is configured for the specific network are provided in a list of the assistance information for access category selection that is configured for the specific network, wherein a size of the list is equal to a number of networks sharing a cell and each entry inside the list is present.

12. The solution of clause 1, wherein the set of access control parameters include a set of parameters for at least one neighboring cell, a neighbor frequency, or a frequency band.

13. The solution of clause 1, wherein the set of access control parameters include a set of parameters for a secondary cell, a secondary frequency, a secondary frequency band, and/or a secondary cell group.

14. The solution of clause 1, wherein the set of access control parameters include a set of parameters for an assistant cell, an assistant frequency, or a frequency band, wherein any of the assistant cell, the assistant frequency, and/or assistant frequency band is a cell, frequency, and/or frequency band to be used for the terminal together with a camping cell.

15. The solution of any of clauses 1, 12, 13, and 14, further comprising: selecting, by the wireless node, a neighboring cell, a neighbor frequency, an assistant cell, an assistant frequency, a cell in the assistant cell group, a secondary cell, and/or a cell in the secondary cell group based on determining that the set of access control parameters of a current cell exceeds a threshold level.

16. The solution of clause 1, wherein the set of access control parameters include UAC parameters for multiple wireless device types.

17. The solution of clause 16, wherein the set of access control parameters include a first subset of parameters for the wireless node that supports Evolved-Universal Terrestrial Radio Access-New Radio Dual Connectivity (EN-DC) communication and a second subset of parameters that are applicable to other types of wireless devices.

18. The solution of clause 16, wherein the set of access control parameters include a first subset of parameters for the wireless node that supports Next-Generation Radio Access Network (NG-RAN) Evolved Universal Terrestrial Radio Access New Radio (E-UTRA-NR) Dual Connectivity (NGEN-DC) communication and a second subset of parameters that are applicable to other types of wireless devices.

19. The solution of clause 16, wherein the set of access control parameters include a first subset of parameters for the wireless node that supports New Radio E-UTRA Dual Connectivity (NE-DC) communication and a second subset of parameters that are applicable to other types of wireless devices.

20. The solution of clause 16, wherein the set of access control parameters include a first subset of parameters for a new radio light terminal, a machine-type communications (MTC) terminal, and/or an internet of things (IoT) terminal.

21. The solution of clause 16, wherein the set of access control parameters include a first subset of parameters for the wireless node that supports New Radio Dual Connectivity (NR-DC) communication and a second subset of parameters that are applicable to other types of wireless devices.

22. The solution of clause 16, wherein the set of access control parameters include a first subset of parameters for the wireless node that supports Multi-Radio Access Technology Dual Connectivity (MR-DC) communication and a second subset of parameters that are applicable to other types of wireless devices.

23. The solution of any of clauses 17-22, wherein the first subset of parameters for the wireless node include a higher pass rate than a pass rate of the second subset of parameters that are applicable to other types of wireless devices.

24. The solution of clause 1, wherein the set of access control parameters are transmitted in a system information block (SIB) in the first message.

25. The solution of clause 1, wherein the first message is transmitted via dedicated radio resource control (RRC) signaling.

26. A solution for wireless communication, comprising: transmitting, by a network node, a first message that includes a set of access control parameters to a wireless node; and receiving, by the network node, a second message from the wireless node, the second message transmitted by the wireless node based on a result of a barring check performed by the wireless node to determine whether a certain access attempt is allowed using the set of access control parameters.

27. The solution of clause 26, wherein the set of access control parameters are configured for a data transmission service in an inactive state and/or an idle state.

28. The solution of any of clauses 26 and 27, wherein the data transmission service in the inactive state and/or the idle state is categorized as access category 7, wherein the wireless node is configured to perform the barring check using the set of access control parameters associated with the access category 7.

29. The solution of any of clauses 26 and 27, wherein the data transmission service in the inactive state and/or the idle state is categorized as a new access category, wherein the wireless node is configured to perform the barring check using the set of access control parameters associated with the new access category.

30. The solution of any of clauses 26 and 27, wherein the set of access control parameters include a bit indicative of whether the data transmission in the inactive state and/or the idle state is allowed, wherein the wireless node is configured to initiate data transmission in the inactive and/or the idle state responsive to determining that the bit indicates that the data transmission is allowed.

31. The solution of any of clauses 26 and 27, wherein the data transmission service in the inactive state and/or the idle state is supported by the network node, and wherein the wireless node is configured to initiate the data transmission service without performing the barring check.

32. The solution of clause 26, wherein the set of access control parameters include unified access control (UAC) parameters that include barring information representative of assistance information for access category selection are provided together with an associated network index.

33. The solution of clause 26, wherein the set of access control parameters include barring information representative of assistance information for access category selection are provided together with a bitmap.

34. The solution of clause 33, wherein a size of the bitmap equals a number of networks sharing a cell, wherein a first bit indicates whether a first network of the number of networks sharing the cell are associated with the barring information representative of assistance information for access category selection that is configured for the specific network.

35. The solution of clause 26, wherein the set of access control parameters include UAC parameters that include barring information representative of the assistance information for access category selection that is configured for the specific network are provided in a list of the associated barring information set that is configured for the specific network, wherein a size of the list is equal to a number of networks sharing a cell and each entry inside the list is present.

36. The solution of clause 26, wherein the set of access control parameters include a set of parameters for any of a neighboring cell, a neighbor frequency, a neighbor frequency band, an assistant cell, an assistant frequency, an assistance frequency band, an assistant cell group, a secondary cell, and a secondary cell group.

37. The solution of clause 26, wherein the set of access control parameters include UAC parameters for multiple wireless device types.

38. The solution of clause 26, wherein the first message includes the set of access control parameters are transmitted in a system information block (SIB) in the first message.

39. The solution of clause 26, wherein the first message is transmitted via dedicated radio resource control (RRC) signaling.

40. An apparatus for wireless communication comprising a processor that is configured to carry out the solution of any of clauses 1 to 39.

41. A non-transitory computer readable medium having code stored thereon, the code when executed by a processor, causing the processor to implement a solution recited in any of clauses 1 to 39.

The details of one or more implementations are set forth in the accompanying attachments, the drawings, and the description below. Other features will be apparent from the description and drawings, and from the clauses.

DETAILED DESCRIPTION

Figure 1:
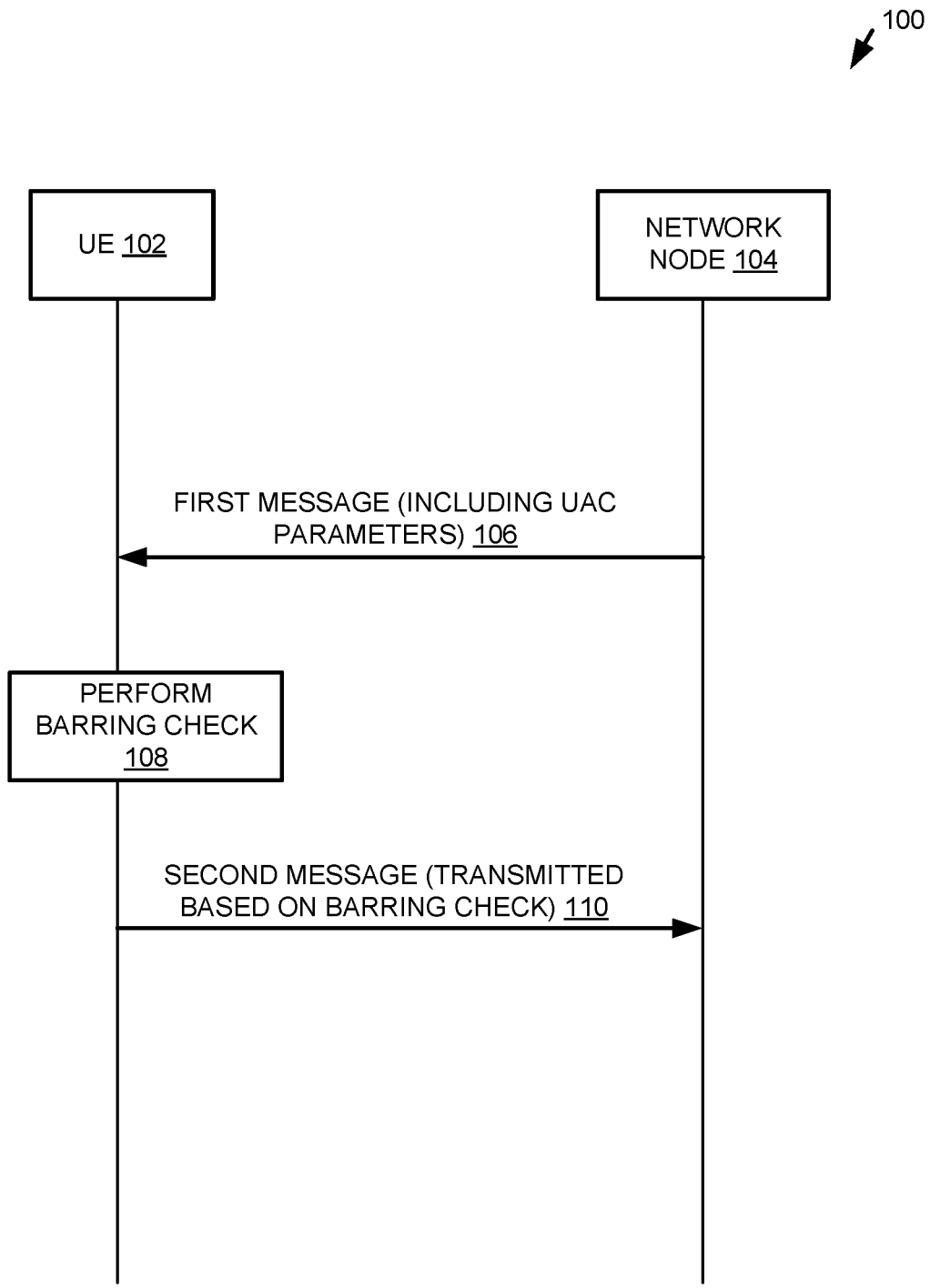
FIG. 1 is an example signaling process for providing UAC parameters to a UE capable of performing a barring check based on the received parameters.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

A Unified access control (UAC) mechanism may be primarily used to perform load balance at the network side by configuring the UAC barring parameters. The services initiated by UE may be categorized into different access categories and different UEs are categorized into different access identities. The UAC parameters (including a barring factor showing the probability that access attempt would be allowed during access barring check and a barring time indicating the minimum time in seconds before a new access attempt is to be performed after an access attempt was barred at access barring check for the same access category) may be configured for each access category and access identity.

A user equipment (UE), aware of its own access identity and the access category of the service it requires, may draw a random number 'rand' uniformly distributed in the range: 0≤rand<1 before initiating the access attempt. If 'rand' is lower than the value indicated by uac-BarringFactor included in "UAC barring parameter," UE may consider the access attempt as allowed. Otherwise, the UE may consider the access attempt as barred. In this way, the network may be able to control what kind of UEs and what kind of services are preferred while others are not preferred or even barred to balance the load at network side.

The UAC parameters may now broadcast per cell, and all UE's that camp on a certain cell may apply the UAC parameters broadcast from this cell to perform barring check. The UAC-AccessCategory1-SelectionAssistanceInfo may be provided from a network to UE to help decide whether access category 1 should be applied in performing unified access control.

The UAC-AccessCategory1-SelectionAssistanceInfo may now be provided in two possible ways. A first way may be to broadcast one common UAC-AccessCategory1-SelectionAssistanceInfo for all the networks. A second way may be to broadcast UAC-AccessCategory1-SelectionAssistanceInfo for each PLMN. Once the network decides to broadcast UAC-AccessCategory1-SelectionAssistanceInfo for each PLMN, the UAC-AccessCategory1-SelectionAssistanceInfo may be present, which may indicate that one PLMN may have to broadcast such a parameter no matter the PLMN supports access category 1 selection or not.

Unified access control (UAC) parameters generally can be broadcast per cell and each UE that camps on a certain cell can apply the UAC parameters broadcast from each cell to perform a barring check. Broadcasting UAC parameters for a neighbor cell or frequency can be helpful for UE to reselect a cell or frequency in which the services are allowed. In addition, broadcasting different UAC parameters for different types of UE under the same cell can better assist in balancing a load at the network side.

The UAC access category selection assistance information (e.g., UAC-AccessCategory1-SelectionAssistanceInfo) can be provided from a network node to a UE to help decide whether access category 1 should be applied in performing unified access control. For the case when more than one network node (e.g., the network includes a PLMN or NPN) shares the same cell, it may be required that different networks can provide different UAC-AccessCategory1-SelectionAssistanceInfo separately.

Accordingly, the present embodiments relate to a network capable of providing UAC parameters to a UE, and the UE performing a barring check based on the received parameters. UAC-AccessCategory1-SelectionAssistanceInfo per network can be configured while still allowing certain network not to broadcast it. Further, the present embodiments can configure UAC parameters per UE type, per frequency, or per network.

FIG. 1 is an example signaling process 100 for providing UAC parameters to a UE capable of performing a barring check based on the received parameters. As shown in FIG. 1, a network node 104 can send a first message 106 to the UE 102. The first message 106 can include UAC parameters. The UE 102 can perform a barring check 108 using the UAC parameters. The UE can send a second message 110 based on the results of the barring check to the network node 104.

Issue 1

The UAC parameters can include a list of barring information set (e.g., uac-BarringInfoSetList). In each barring information set, any of a barring factor, barring time and a bit string (each bit indicates whether the access is allowed for a certain access identity) can be included.

The UAC parameters can include a common barring information (e.g., uac-BarringForCommon) applicable for all the networks (including PLMN or NPN). In this common barring information, a list of access categories with associated barring information set can be included.

The UAC parameters can include a list of barring information for different networks (e.g. uac-BarringPerPLMN-List or uac-BarringPerNPN-List). A list of access categories with associated barring information set can be configured for each network.

The UAC parameters can include UAC barring parameters for data transmission in an inactive and/or an idle state.

In a first alternative, a data transmission service in an inactive and/or idle state can be categorized as Access Category 7 (=MO_data), and the UE can perform access barring check based on the access control parameters associated with access category 7.

In a second alternative, a specific Access category (e.g., MO data on RRC level resulting from other than paging) can be introduced, and the UE can perform access barring check based on the access control parameters associated with this new access category.

In a third alternative, one bit showing data transmission in inactive and/or idle state is allowed or not can be introduced, and the UE can initiate such service when allowed.

In a fourth alternative, a data transmission in inactive and/or idle state can be supported by default at the network side, and the UE can initiate such service without performing barring check.

A common uac-AccessCategory1-SelectionAssistanceInfo may be applicable for all the networks. A list of uac-AccessCategory1-SelectionAssistanceInfo may be configured and each entry may be associated with a certain network (e.g., NPN or PLMN). The following examples are given on configuring uac-AccessCategory1-SelectionAssistanceInfo for each network individually.

In a first example, a new information element UAC-AccessCategory1-SelectionAssistanceInfo-v1xyz with candidate value: "a, b, c, null" can be introduced and the network can set the corresponding UAC-AccessCategory1-SelectionAssistanceInfo as "null" when network may not configure assistance information for access category 1 selection.

Example 1

```
-- ASN1START
-- TAG-SIB1-START
SIB1 ::=       SEQUENCE {
Partly omitted
        uac-BarringInfo                              SEQUENCE {
            uac-BarringForCommon                          UAC-BarringPerCatList
        OPTIONAL,    -- Need S
            uac-BarringPerPLMN-List
        OPTIONAL,    -- Need S
            uac-BarringInfoSetList                  ,
            uac-AccessCategory1-SelectionAssistanceInfo CHOICE {
                plmnCommon                                UAC-
AccessCategory1-SelectionAssistanceInfo,
                individualPLMNList                        SEQUENCE (SIZE
(2..maxPLMN)) OF UAC-AccessCategory1-SelectionAssistanceInfo
            }
                                                          OPTIONAL   -- Need S
    }
                                                          OPTIONAL,  -- Need R
    useFullResumeID                                   ENUMERATED {true}
OPTIONAL,   -- Need R
    lateNonCriticalExtension                          OCTET STRING
OPTIONAL,
    nonCriticalExtension                              SIB1-v16xy-IEs
OPTIONAL
}
SIB1-v16xy-IEs ::=                            SEQUENCE {
    uac-BarringInfo-v16xy                         SEQUENCE {
        uac-AccessCategory1-SelectionAssistanceInfo-v16xy SEQUENCE {
            individualPLMNList-v16xy                  SEQUENCE (SIZE
(2..maxPLMN)) OF UAC-AccessCategory1-SelectionAssistanceInfo-v16xy
        }
                                                      OPTIONAL   -- Need S
    nonCriticalExtension                          SEQUENCE { }
OPTIONAL
}
UAC-AccessCategory1-SelectionAssistanceInfo ::=       ENUMERATED {a, b, c}
UAC-AccessCategory1-SelectionAssistanceInfo-v16xy ::= ENUMERATED {a, b, c,
null}
-- TAG-SIB1-STOP
-- ASN1STOP
```

In a second example, a uac-AccessCategory1-SelectionAssistanceInfoExt-v16xy with value "null" may be introduced and if this field is present, the UE can ignore the legacy field and consider the access barring for delay tolerant service is not configured.

```
SIB1-v16xy-IEs ::=                              SEQUENCE {
    uac-BarringInfo-v16xy                           SEQUENCE {
        individualPLMNList-v16xy                    SEQUENCE (SIZE (2..maxPLMN))
OF UAC-AccessCategory1-SelectionAssistanceInfo-v16xy
    }
    OPTIONAL   -- Cond individualPLMNList
    nonCriticalExtension                            SEQUENCE { }
OPTIONAL
}
```

```
UAC-AccessCategory1-SelectionAssistanceInfo ::=    ENUMERATED {a, b, c}
UAC-AccessCategory1-SelectionAssistanceInfo-v16xy ::=    SEQUENCE {
    uac-AccessCategory1-SelectionAssistanceInfoExt-v16xy
        ENUMERATED {null}                      OPTIONAL,  --
Need S
}
```

The UAC-AccessCategory1-SelectionAssistanceInfo for each network can be provided by one of the following alternatives. A first alternative can include a network index, which can identify a PLMN, a PNI-NPN (or CAG), or a SNPN, and the associated UAC-AccessCategory1-SelectionAssistanceInfo is provided in SIB1. Only the network (a PLMN, a PNI-NPN or a SNPN) with an associated UAC-AccessCategory1-SelectionAssistanceInfo may be included and provided to UE in SIB1. This may be represented in example 1 below.

A second alternative may include a bitmap along with a list of UAC-AccessCategory1-SelectionAssistanceInfo may be provided in SIB1. This may be represented in example 2 below.

The size of the bitmap may equal the number of the PLMNs or NPNs sharing the same cell. The leftmost bit may indicate whether the first PLMN in the PLMN-IdentityInfoList or the first NPN in the NPN-IdentityInfoList is associated with UAC-AccessCategory1-SelectionAssistanceInfo or not. If a bit in the bit map is set to "1," it can indicate that the corresponding network is associated with UAC-AccessCategory1-SelectionAssistanceInfo.

The first UAC-AccessCategory1-SelectionAssistanceInfo in the list may be associated with the network (a PLMN or an NPN) identified by the first bit with a value of "1." The second UAC-AccessCategory1-SelectionAssistanceInfo in the list may be associated with the network (a PLMN or a NPN) identified by the second bit with a value of "1."

A list of UAC-AccessCategory1-SelectionAssistanceInfo, the size of the list may equal the number of networks (PLMNs, NPNs or PLMN+NPNs) sharing the cell. If a certain network is not associated with a UAC-AccessCategory1-SelectionAssistanceInfo, the corresponding entry in the list may be absent. This may be represented in example 3 below.

Example 1

```
SIB1-v16xy-IEs ::=                      SEQUENCE {
    uac-BarringInfo-v16xy                   SEQUENCE {
        individualPLMNList-v16xy                SEQUENCE (SIZE (1..maxPLMN)) OF
UAC-AccessCategory1-SelectionAssistanceInfo-v16xy
    }
        OPTIONAL
    nonCriticalExtension                    SEQUENCE { }
OPTIONAL
}
UAC-AccessCategory1-SelectionAssistanceInfo ::=    ENUMERATED {a, b, c}
UAC-AccessCategory1-SelectionAssistanceInfo-v16xy ::=    SEQUENCE {
networkindex-r16                        INTEGER (1..maxPLMN),
        UAC-AccessCategory1-SelectionAssistanceInfo ::=    ENUMERATED {a, b,
c}
}
```

Example 2

```
-- ASN1START
-- TAG-SIB1-START
SIB1 ::=    SEQUENCE {
Partly omitted
        uac-BarringInfo                         SEQUENCE {
            uac-BarringForCommon                    UAC-BarringPerCatList
OPTIONAL,   --Need S
            uac-BarringPerPLMN-List                 UAC-BarringPerPLMN-List
OPTIONAL,   --Need S
            uac-BarringInfoSetList                  UAC-BarringInfoSetList,
            uac-AccessCategory1-SelectionAssistanceInfo CHOICE {
                plmnCommon                              UAC-
AccessCategory1-SelectionAssistanceInfo,
                individualPLMNList                      SEQUENCE (SIZE
(2..maxPLMN)) OF UAC-AccessCategory1-SelectionAssistanceInfo
            }
                                                    OPTIONAL   -- Need S
        }
                                                    OPTIONAL,  -- Need R
    useFullResumeID                         ENUMERATED{true}
OPTIONAL,   -- Need R
    lateNonCriticalExtension                OCTET STRING
```

-continued

```
OPTIONAL,
    nonCriticalExtension         SIB1-v16xy-IEs
OPTIONAL
}
SIB1-v16xy-IEs ::=              SEQUENCE {
    uac-BarringInfo-v16xy                SEQUENCE {
        uac-AccessCategory1-SelectionAssistanceInfo-v16xy SEQUENCE {
            individualPLMNList-v16xy            SEQUENCE {
                                         uac-AccessCategory1-SelectionAssistanceInfo-
PresenceBitmap-r16               BIT STRING (SIZE (2..maxPLMN)),
                                 uac-AccessCategory1-SelectionAssistanceInfoList-r16
                                 SEQUENCE (SIZE (1..maxPLMN)) OF UAC-
AccessCategory1-SelectionAssistanceInfo
}
        }
                                    OPTIONAL    -- Need S
    nonCriticalExtension         SEQUENCE { }
OPTIONAL
}
UAC-AccessCategory1-SelectionAssistanceInfo ::=   ENUMERATED {a, b, c}
-- TAG-SIB1-STOP
-- ASN1STOP
SIB1-v16xy-IEs ::=              SEQUENCE {
    uac-BarringInfo-v16xy                SEQUENCE {
        uac-AccessCategory1-SelectionAssistanceInfo-PresenceBitmap-r16
        BIT STRING (SIZE (2..maxPLMN))
    }
                                    OPTIONAL    -- Need S
    nonCriticalExtension         SEQUENCE { }
OPTIONAL
}
```

Example 3                                                    30

```
-- ASN1START
-- TAG-SIB1-START
SIB1 ::=                        SEQUENCE {
Partly omitted
    uac-BarringInfo                      SEQUENCE {
        uac-BarringForCommon                 UAC-BarringPerCatList
    OPTIONAL,   -- Need S
        uac-BarringPerPLMN-List              UAC-BarringPerPLMN-List
    OPTIONAL,   -- Need S
        uac-BarringInfoSetList               UAC-BarringInfoSetList,
        uac-AccessCategory1-SelectionAssistanceInfo CHOICE {
            plmnCommon                       UAC-
AccessCategory1-SelectionAssistanceInfo,
            individualPLMNList               SEQUENCE (SIZE
(2..maxPLMN)) OF UAC-AccessCategory1-SelectionAssistanceInfo
        }
                                    OPTIONAL   -- Need S
    }
                                OPTIONAL,   -- Need R
    useFullResumeID              ENUMERATED{true}
OPTIONAL,   -- Need R
    lateNonCriticalExtension     OCTET STRING
OPTIONAL,
    nonCriticalExtension         SIB1-v16xy-IEs
OPTIONAL
}
SIB1-v16xy-IEs ::=              SEQUENCE {
    uac-BarringInfo-v16xy                SEQUENCE {
        uac-AccessCategory1-SelectionAssistanceInfo-v16xy SEQUENCE {
            individualPLMNList-v16xy            SEQUENCE (SIZE
(2..maxPLMN)) OF IndividualPLMN-r16
        }
                                    OPTIONAL    -- Need S
    nonCriticalExtension         SEQUENCE { }
OPTIONAL
}
```

-continued

```
UAC-AccessCategory1-SelectionAssistanceInfo ::=    ENUMERATED {a, b, c}
IndividualPLMN-r16 ::=                        SEQUENCE {
    individualPLMN-r16                            ENUMERATED {a, b, c}
                                        OPTIONAL,    -- Need R
}
-- TAG-SIB1-STOP
-- ASN1STOP
```

Issue 2

The UAC parameters for neighbor cells/frequencies/frequency bands, assistant cells/frequencies/frequency bands/cell groups, secondary cells/frequencies/frequency bands/cell groups, or different UE types may be broadcast or unicast to UE. Broadcast or unicast UAC parameters can be for neighbor cells, neighbor frequencies (or frequency band, secondary cell, or secondary cell group, assistant cell, and/or assistant frequency (or frequency band). The assistant cell and assistant frequency may refer to the cell and/or frequencies which can be used for the UE together with the camping cell (e.g., by means of carrier aggregation and/or dual/multiple connectivity).

An example for the usage can include UE deciding to reselect to a neighbor cell/frequency, secondary cell, or a cell in the secondary cell group, if the UAC parameters of the current cell showing that the cell is over loaded and there is lower possibility that the access attempts will be allowed. A network node (or NW) can determine the target cell/frequency based on the UAC parameters of neighbor cells/frequencies, secondary cell, secondary cell group, or different UE types and handover UE to the cell/frequency. With these UAC parameters for neighbor cells/frequencies described above, the UE can initiate the cell reselection based on the UAC parameters. For example, if the access of current camping cell is not allowed (or allowed but with a lower access possibility), but the access of a neighbor cell/frequency is allowed (or with a higher access possibility), then the UE can initiate the cell reselection to the neighbor cell/frequency where the access is allowed. With these UAC parameters for neighbor cells/frequencies described above, the UE can initiate the initial access procedure on the related neighbor cell/frequency directly.

For example, if the access of current camping cell is not allowed, but the access of a neighbor cell/frequency is allowed, then the UE can initiate the initial access procedure on the related neighbor cell/frequency directly. With these UAC parameters for secondary cell, secondary cell group, assistant cell, and/or assistant frequency (or frequency band), if the UE support carrier aggregation or dual connectivity with the cell/frequencies associated with the UAC parameters, and based on the associated UAC parameters, the access to the concerned "secondary cell, secondary cell group, assistant cell, and/or assistant frequency (or frequency band)" can be allowed, then the UE may be allowed to initiate the access in the camping cell. Even the access to the camping cell may not be allowed based on the UAC parameters associated to the camping cell (e.g., the legacy UAC parameters described in the background). For example, in case the camping cell is overloaded but the neighbor cell is not, and the neighbor cell can be used to serve the UE by means of carrier aggregation or dual connectivity. If the UE can support carrier aggregation with the neighbor cell and based on the UAC parameters the access to the neighbor cell is allowed, then the access in camping cell can be allowed, and the NW can provide services to UE through the neighbor cell by means of carrier aggregation. If the UE does not support carrier aggregation/dual connectivity with the neighbor cell, then the access in the camping cell may not be allowed.

Broadcast or unicast different UAC parameters can be sent for different UE types. One or multiple alternatives below, including the combination of multiple alternatives, can be considered. The UE can select one or multiple of them based on the rule specified in specs. For example, the processing order and/or the priority for multiple set of UAC parameters should be specified in specs. Alternatively, the UE can select one or multiple of them based on the capability. For example, if multiple set of UAC parameters for different frequency/band and/or different services and/or different UE with specific capability (including UE type) are configured, the UE may only consider the corresponding UAC parameters associated to the capability which the UE can support (e.g. the frequency/band the UE can support, the services the UE can support and/or the specific capability the UE can support). Alternatively, UE can check the UAC parameters one by one. The order of multiple UAC parameters for check can be specified in specs or left to UE implementation. An indication may be transmitted to UE saying UE can only initiate access attempt when all of the UAC parameters or some specific UAC parameters (will be listed in specs or indicate to UE) showing the corresponding access is allowed. UE can check the first UAC parameters, and if passed the UE check the second set of UAC parameters, and so on until all the UAC parameters or all the UAC parameters in the list have been checked.

An indication may be transmitted to UE saying UE is allowed to initiate access attempt if any one of the UAC parameters showing permission for the corresponding access attempt. UE can check the first UAC parameters and if not passed, UE will check the second UAC parameters and so on. Alternatively, it may be specified that the relationship between two or multiple set of UAC parameters can be either "and" or "or", based on the description in specs. When the relationship between two or multiple set of UAC parameters is "and," UE can initiate access attempt if both of the two set UAC parameters show permission. When the relationship between two or multiple set of UAC parameters is "or," UE can initiate access attempt if any of the two set UAC parameters show permission. Alternatively, the UE can select the most strict rule or least strict rule/parameters.

The NW can decide the target cell/frequency based on the UAC parameters of neighbor cells/frequencies, secondary cell, secondary cell group, or different UE types and handover UE to the cell/frequency. With the UAC parameters for neighbor cells/frequencies described above, the UE can initiate the cell reselection based on the UAC parameters. For example, if the access of current camping cell is not allowed (or allowed but with a lower access possibility), but the access of a neighbor cell/frequency is allowed (or with a higher access possibility), then the UE can initiate the cell reselection to the neighbor cell/frequency where the access is allowed. With the UAC parameters for neighbor cells/frequencies described above, the UE can initiate the initial access procedure on the related neighbor cell/frequency directly. For example, if the access of current camping cell is not allowed, but the access of a neighbor cell/frequency is allowed, then the UE can initiate the initial access procedure on the related neighbor cell/frequency directly.

With the UAC parameters for secondary cell, secondary cell group, assistant cell, and/or assistant frequency (or frequency band), if the UE support carrier aggregation or dual connectivity with the cell/frequencies associated with the UAC parameters, and based on the associated UAC parameters, the access to the concerned "secondary cell, secondary cell group, assistant cell, and/or assistant frequency (or frequency band)" is allowed, then the UE is allowed to initiate the access in the camping cell, even the access to the camping cell is not allowed based on the UAC parameters associated to the camping cell (e.g. the legacy UAC parameters described in the background). For example, in case the camping cell is overloaded but the neighbor cell is not, and the neighbor cell can be used to serve the UE by means of carrier aggregation or dual connectivity, if the UE can support carrier aggregation with the neighbor cell and based on the UAC parameters the access to the neighbor cell is allowed, then the access in camping cell should be allowed, and the NW can provide services to UE through the neighbor cell by means of carrier aggregation. If the UE does not support carrier aggregation/dual connectivity with the neighbor cell, then the access in the camping cell may not be allowed. Separate broadcast or unicast UAC parameters may be applicable for UE supporting EN-DC and UAC parameters applicable for other UEs. Broadcast or unicast separate UAC parameters for NR light UEs and/or MTC UEs and/or IOT UEs. Separate broadcast or unicast UAC parameters may be applicable for UE supporting NGEN-DC and UAC parameters applicable for other UEs. Separate broadcast or unicast UAC parameters may be applicable for UE supporting NE-DC and UAC parameters for other UEs. Separate broadcast or unicast UAC parameters may be applicable for UE supporting NR-DC and UAC parameters applicable for other UEs. Separate broadcast or unicast UAC parameters may be applicable for UE supporting MR-DC (including EN-DC, NGEN-DC, NE-DC or NR-DC) and UAC parameters for other UEs.

The UAC parameters for UE supporting EN-DC, NGEN-DC, NE-DC, NR-DC or MR-DC can be set with higher pass rate compared to the UAC parameters for other UEs since UE supporting EN-DC, NGEN-DC, NE-DC, NR-DC or MR-DC can be bypass to the second cell group for service thus will not increase the load in the primary cell who broadcast the UAC parameters.

Issue 3

The UAC parameters can be broadcast in system information (e.g., SIB1, SIB2, SIB3, SIB4, SIB5 or a new SIB) or dedicated RRC signaling (e.g., RRCRelease message or RRCReconfiguration message). Optionally, in the case of multiple UAC parameters are configured in system information, the NW can configure UE with dedicated signaling that which UAC parameters will be used for UE in IDLE and/or INACTIVE and/or CONNECTED mode. A common configuration can be applied for different mode, or separate configuration can be configured for different mode.

Issue 4

The UAC parameters can be exchanged between two network nodes. The UAC parameters for the serving cell/frequency or neighbor cells/frequencies, secondary cell, secondary cell group, or different UE types can be transmitted from a RAN node to another RAN node via any of a XN setup response message, a XN setup request message, a handover request message, a handover request acknowledge message, a handover preparation failure message, a retrieve UE context request message, and a retrieve UE context response message.

The UAC parameters for the serving cell/frequency or neighbor cells/frequencies, secondary cell, secondary cell group, or different UE types can be transmitted from a RAN node to a core network node via any of an initial context setup response message, an initial context setup failure message, a PDU session resource setup response message, a PDU session resource modify response message, a user equipment (UE) context modification response message, a handover required message, an initial UE message, a handover failure message, a handover request acknowledge message, and a path switch request message.

The UAC parameters for the serving cell/frequency or neighbor cells/frequencies, secondary cell, secondary cell group, or different UE types can be transmitted from a core network node to a RAN node via any of an initial context setup request message, a PDU session resource modify request message, a PDU session resource setup request message, a handover command message, a handover request message, a path switch request acknowledge message, a path switch request failure message, and a UE context modification request message.

Issue 5

UE behavior upon receiving the UAC parameters for data transmission in INACTIVE and/or IDLE. Upon receiving the UAC parameters for data transmission in INACTIVE and/or IDLE, UE may perform access barring check based on the received UAC parameters The UAC parameters for data transmission in INACTIVE and/or IDLE can either be an indicator showing allowed or not or a barring information set in which a barring factor and a barring time is included. The indicator or barring information set can be configured as a common configuration applicable to all the networks or network specific configuration in which each network is linked to an indicator or a barring information set.

If the barring check result showing that the data transmission in an inactive state and/or an idle state may not be allowed.

The UE may start a timer with the value set to the barring time and initiate the access tempt when the timer expires. Alternatively, the UE may initiate RRC connection set up or RRC connection resume procedure.

Issue 6

This issue may relate to a UE's behavior when multiple UAC parameters are configured. UAC can check if multiple set of UAC parameters are applicable to the UE/services. One or multiple alternatives below, including the combination of multiple alternatives, can be considered.

The UE can select one or multiple of them based on the rule specified in specs. For example, the processing order and/or the priority for multiple set of UAC parameters can be specified in specs.

Alternatively, the UE can select one or multiple of them based on the capability. For example, if multiple set of UAC parameters for different frequency/band and/or different services and/or different UE with specific capability (including UE type) are configured, the UE can only consider the corresponding UAC parameters associated to the capability which the UE can support (e.g., the frequency/band the UE can support, the services the UE can support and/or the specific capability the UE can support).

Alternatively, the UE can check the UAC parameters one by one. The order of multiple UAC parameters for check can be specified or left for UE implementation.

An indication can be transmitted to UE saying UE can only initiate access attempt when all of the UAC parameters or some specific UAC parameters (will be listed or indicated to UE) showing the corresponding access is allowed. The UE can check the first UAC parameters, and if passed the UE check the second set of UAC parameters, and so on until all the UAC parameters or all the UAC parameters in the list have been checked.

An indication can be transmitted to UE indicating that the UE is allowed to initiate access attempt if any one of the UAC parameters showing permission for the corresponding access attempt. The UE can check the first UAC parameters and if not passed, UE can check the second UAC parameters and so on.

Alternatively, the relationship between two or multiple set of UAC parameters can be either "and" or "or."

When the relationship between two or multiple set of UAC parameters is "and," the UE can initiate an access attempt if both of the two set UAC parameters show permission.

When the relationship between two or multiple set of UAC parameters is "or," the UE can initiate access attempt if any of the two set UAC parameters show permission.

Alternatively, the UE can take the most strict rule or the least strict rule/parameters.

Implementation Example 1: Providing the UAC Parameters for the Redirected Carrier in RRCRelease Message

```
-- ASN1START
-- TAG-RRCRELEASE-START
RRCRelease ::=                              SEQUENCE {
    rrc-TransactionIdentifier                   RRC-TransactionIdentifier,
    criticalExtensions                          CHOICE {
        rrcRelease                                  RRCRelease-IEs,
        criticalExtensionsFuture                    SEQUENCE { }
    }
}
RRCRelease-IEs ::=                          SEQUENCE {
    redirectedCarrierInfo                       RedirectedCarrierInfo
OPTIONAL,    -- Need N
    cellReselectionPriorities                   CellReselectionPriorities
OPTIONAL,    -- Need R
    suspendConfig                               SuspendConfig
OPTIONAL,    -- Need R
    deprioritisationReq                         SEQUENCE {
        deprioritisationType                        ENUMERATED {frequency, nr},
        deprioritisationTimer                       ENUMERATED {min5, min10, min15,
min30}
    }
OPTIONAL,    -- Need N
    lateNonCriticalExtension                    OCTET STRING
OPTIONAL,
    nonCriticalExtension                        RRCRelease-v1540-IEs
OPTIONAL
}
RRCRelease-v1540-IEs ::=                    SEQUENCE {
    waitTime                                    RejectWaitTime          OPTIONAL, --
Need N
    nonCriticalExtension                        SEQUENCE { }            OPTIONAL
}
RedirectedCarrierInfo ::=                   CHOICE {
    nr                                          CarrierInfoNR,
    eutra                                       RedirectedCarrierInfo-EUTRA,
    ...
}
RedirectedCarrierInfo-EUTRA ::=             SEQUENCE {
    eutraFrequency                              ARFCN-ValueEUTRA,
    cnType                                      ENUMERATED {epc,fiveGC}
OPTIONAL    -- Need N
}
CarrierInfoNR ::=                           SEQUENCE {
    carrierFreq                                 ARFCN-ValueNR,
    ssbSubcarrierSpacing                        SubcarrierSpacing,
    smtc                                        SSB-MTC
OPTIONAL,    -- Need S
    ...,
    [[
    uac-BarringInfo                             SEQUENCE {
        uac-BarringForCommon                        UAC-BarringPerCatList
OPTIONAL,    -- Need S
        uac-BarringPerPLMN-List                     UAC-BarringPerPLMN-List
OPTIONAL,    -- Need S
        uac-BarringInfoSetList                      UAC-BarringInfoSetList,
        uac-AccessCategory1-SelectionAssistanceInfo CHOICE {
            plmnCommon                                  UAC-AccessCategory1-
SelectionAssistanceInfo,
            individualPLMNList                          SEQUENCE (SIZE
```

```
(2..maxPLMN)) OF UAC-AccessCategory1-SelectionAssistanceInfo
   }
OPTIONAL   -- Need S
}
OPTIONAL,   -- Need R
]]
}
SuspendConfig ::=                       SEQUENCE {
   fullI-RNTI                               I-RNTI-Value,
   shortI-RNTI                              ShortI-RNTI-Value,
   ran-PagingCycle                          PagingCycle,
   ran-NotificationAreaInfo                 RAN-NotificationAreaInfo
OPTIONAL,   -- Need M
   t380                                     PeriodicRNAU-TimerValue
OPTIONAL,   -- Need R
   nextHopChainingCount                     NextHopChainingCount,
   ...
}
PeriodicRNAU-TimerValue ::=             ENUMERATED { min5, min10, min20, min30,
min60, min120, min360, min720}
CellReselectionPriorities ::=           SEQUENCE {
   freqPriorityListEUTRA                    FreqPriorityListEUTRA
OPTIONAL,   -- Need M
   freqPriorityListNR                       FreqPriorityListNR
OPTIONAL,   -- Need M
   t320                                     ENUMERATED {min5, min10, min20, min30,
min60, min120, min180, spare1}           OPTIONAL,   -- Need R
   ...
}
PagingCycle ::=                         ENUMERATED {rf32, rf64, rf128, rf256}
FreqPriorityListEUTRA ::=               SEQUENCE (SIZE (1..maxFreq)) OF
FreqPriorityEUTRA
FreqPriorityListNR ::=                  SEQUENCE (SIZE (1..maxFreq)) OF
FreqPriorityNR
FreqPriorityEUTRA ::=                   SEQUENCE {
   carrierFreq                              ARFCN-ValueEUTRA,
   cellReselectionPriority                  CellReselectionPriority,
   cellReselectionSubPriority               CellReselectionSubPriority
OPTIONAL   -- Need R
}
FreqPriorityNR ::=                      SEQUENCE {
   carrierFreq                              ARFCN-ValueNR,
   cellReselectionPriority                  CellReselectionPriority,
   cellReselectionSubPriority               CellReselectionSubPriority
OPTIONAL   -- Need R
}
RAN-NotificationAreaInfo ::=            CHOICE {
   cellList                                 PLMN-RAN-AreaCellList,
   ran-AreaConfigList                       PLMN-RAN-AreaConfigList,
   ...
}
PLMN-RAN-AreaCellList ::=               SEQUENCE (SIZE (1..maxPLMNIdentities))
OF PLMN-RAN-AreaCell
PLMN-RAN-AreaCell ::=                   SEQUENCE {
   plmn-Identity                            PLMN-Identity
OPTIONAL,   -- Need S
   ran-AreaCells                            SEQUENCE (SIZE (1..32)) OF   CellIdentity
}
PLMN-RAN-AreaConfigList ::=             SEQUENCE (SIZE (1..maxPLMNIdentities))
OF PLMN-RAN-AreaConfig
PLMN-RAN-AreaConfig ::=                 SEQUENCE {
   plmn-Identity                            PLMN-Identity
OPTIONAL,   -- Need S
   ran-Area                                 SEQUENCE (SIZE (1..16)) OF RAN-
AreaConfig
}
RAN-AreaConfig ::=                      SEQUENCE {
   trackingAreaCode                      TrackingAreaCode,
   ran-AreaCodeList                      SEQUENCE (SIZE (1..32)) OF   RAN-AreaCode
OPTIONAL   -- Need R
}
-- TAG-RRCRELEASE-STOP
-- ASN1STOP
```

Example 2: Providing UAC Parameters for Neighbour Frequencies in RRCRelease Message A list of UAC-BarringPerFrequency is provided in RRCRelease message and the size of the list equals to the number of frequencies provided in freqPriorityListNR. Each UAC-BarringPerFrequency in the list is linked to a frequency provided in freqPriorityListNR. If a certain frequency is not associated with a UAC-BarringPerFrequency, the corresponding entry in the list is absent.

```
-- ASN1START
-- TAG-RRCRELEASE-START
RRCRelease ::=                              SEQUENCE {
    rrc-TransactionIdentifier                   RRC-TransactionIdentifier,
    criticalExtensions                          CHOICE {
        rrcRelease                                  RRCRelease-IEs,
        criticalExtensionsFuture                    SEQUENCE { }
    }
}
RRCRelease-IEs ::=                          SEQUENCE {
    redirectedCarrierInfo                       RedirectedCarrierInfo                           OPTIONAL,  -- Need N
    cellReselectionPriorities                   CellReselectionPriorities                       OPTIONAL,  -- Need R
    suspendConfig                               SuspendConfig                                   OPTIONAL,  -- Need R
    deprioritisationReq                         SEQUENCE {
        deprioritisationType                        ENUMERATED {frequency, nr},
        deprioritisationTimer                       ENUMERATED {min5, min10, min15, min30}
    }                                                                                           OPTIONAL,  -- Need N
    lateNonCriticalExtension                    OCTET STRING                                    OPTIONAL,
    nonCriticalExtension                        RRCRelease-v1540-IEs                            OPTIONAL
}
RRCRelease-v1540-IEs ::=                    SEQUENCE {
    waitTime                                    RejectWaitTime                                  OPTIONAL, -- Need N
    nonCriticalExtension                        RRCRelease-v1xyz-IEs                            OPTIONAL
}
RRCRelease-v1xyz-IEs ::=                    SEQUENCE {
    uac-BarringPerFrequency-List-r1x            UAC-BarringPerFrequency-List-r16                OPTIONAL, -- Need N
    nonCriticalExtension                        SEQUENCE { }                                    OPTIONAL
}
UAC-BarringPerFrequency-List-r16 ::=        SEQUENCE (SIZE (1..maxFreq)) OF UAC-BarringPerFrequency-r16
UAC-BarringPerFrequency-r16 ::=             SEQUENCE {
    uac-BarringInfo                             SEQUENCE {
        uac-BarringForCommon                        UAC-BarringPerCatList                       OPTIONAL,  -- Need S
        uac-BarringPerPLMN-List                     UAC-BarringPerPLMN-List                     OPTIONAL,  -- Need S
        uac-BarringInfoSetList                      UAC-BarringInfoSetList,
        uac-AccessCategory1-SelectionAssistanceInfo CHOICE {
            plmnCommon                                  UAC-AccessCategory1-SelectionAssistanceInfo,
            individualPLMNList                          SEQUENCE (SIZE (2..maxPLMN)) OF UAC-AccessCategory1-SelectionAssistanceInfo
        }                                                                                       OPTIONAL   -- Need S
    }                                                                                           OPTIONAL,  -- Need R
}
RedirectedCarrierInfo ::=                   CHOICE {
    nr                                          CarrierInfoNR,
    eutra                                       RedirectedCarrierInfo-EUTRA,
    ...
}
RedirectedCarrierInfo-EUTRA ::=             SEQUENCE {
    eutraFrequency                              ARFCN-ValueEUTRA,
    cnType                                      ENUMERATED {epc,fiveGC}                         OPTIONAL  -- Need N
}
CarrierInfoNR ::=                           SEQUENCE {
    carrierFreq                                 ARFCN-ValueNR,
    ssbSubcarrierSpacing                        SubcarrierSpacing,
    smtc                                        SSB-MTC                                         OPTIONAL,  -- Need S
    ...
}
SuspendConfig ::=                           SEQUENCE {
```

```
fullI-RNTI                          I-RNTI-Value,
shortI-RNTI                         ShortI-RNTI-Value,
ran-PagingCycle                     PagingCycle,
ran-NotificationAreaInfo            RAN-NotificationAreaInfo
OPTIONAL,    -- Need M
t380                                PeriodicRNAU-TimerValue
OPTIONAL,    -- Need R
nextHopChainingCount                NextHopChainingCount,
...
}
PeriodicRNAU-TimerValue ::=         ENUMERATED { min5, min10, min20, min30,
min60, min120, min360, min720}
CellReselectionPriorities ::=       SEQUENCE {
    freqPriorityListEUTRA               FreqPriorityListEUTRA
OPTIONAL,    -- Need M
    freqPriorityListNR                  FreqPriorityListNR
OPTIONAL,    -- Need M
    t320                                ENUMERATED {min5, min10, min20, min30,
min60, min120, min180, spare1}      OPTIONAL,   -- Need R
...
}
PagingCycle ::=                     ENUMERATED {rf32, rf64, rf128, rf256}
FreqPriorityListEUTRA ::=           SEQUENCE (SIZE (1..maxFreq)) OF
FreqPriorityEUTRA
FreqPriorityListNR ::=              SEQUENCE (SIZE (1..maxFreq)) OF
FreqPriorityNR
FreqPriorityEUTRA ::=               SEQUENCE {
    carrierFreq                         ARFCN-ValueEUTRA,
    cellReselectionPriority             CellReselectionPriority,
    cellReselectionSubPriority          CellReselectionSubPriority
OPTIONAL    -- Need R
}
FreqPriorityNR ::=                  SEQUENCE {
    carrierFreq                         ARFCN-ValueNR,
    cellReselectionPriority             CellReselectionPriority,
    cellReselectionSubPriority          CellReselectionSubPriority
OPTIONAL    -- Need R
}
RAN-NotificationAreaInfo ::=         CHOICE {
    cellList                            PLMN-RAN-AreaCellList,
    ran-AreaConfigList                  PLMN-RAN-AreaConfigList,
    ...
}
PLMN-RAN-AreaCellList::=             SEQUENCE (SIZE (1.. maxPLMNIdentities))
OF PLMN-RAN-AreaCell
PLMN-RAN-AreaCell ::=                SEQUENCE {
    plmn-Identity                       PLMN-Identity
OPTIONAL,    -- Need S
    ran-AreaCells                       SEQUENCE (SIZE (1..32)) OF   CellIdentity
}
PLMN-RAN-AreaConfigList ::=          SEQUENCE (SIZE (1..maxPLMNIdentities))
OF PLMN-RAN-AreaConfig
PLMN-RAN-AreaConfig ::=              SEQUENCE {
    plmn-Identity                       PLMN-Identity
OPTIONAL,    -- Need S
    ran-Area                            SEQUENCE (SIZE (1..16)) OF   RAN-
AreaConfig
}
RAN-AreaConfig ::=                   SEQUENCE {
    trackingAreaCode                TrackingAreaCode,
    ran-AreaCodeList                SEQUENCE (SIZE (1..32)) OF   RAN-AreaCode
OPTIONAL    -- Need R
}
-- TAG-RRCRELEASE-STOP
-- ASN1STOP
```

Below are implementation examples on providing UAC parameters for different UE types in SIB1. Separate UAC parameters may be broadcast for UE supporting MR-DC and NR light UEs. Upon receiving SIB1, a UE not supporting MR-DC or NR light may perform barring check based on the UAC parameters in uac-BarringInfo. A UE supporting MR-DC may perform barring check based on the UAC parameters in uac-BarringInfo and uac-BarringInfo-MRDC-r1x and initiate access attempt if either one of the uac-BarringInfo and uac-BarringInfo-MRDC-r1x show permission. A UE supporting NR light UE may perform barring check based on the UAC parameters in uac-BarringInfo-NRLight-r1x and initiate access attempt if the uac-BarringInfo-NRLight-r1x show permission.

```
-- ASN1START
-- TAG-SIB1-START
SIB1 ::=        SEQUENCE {
    cellSelectionInfo                           SEQUENCE {
        q-RxLevMin                                  Q-RxLevMin,
        q-RxLevMinOffset                            INTEGER (1..8)
OPTIONAL,   -- Need S
        q-RxLevMinSUL                               Q-RxLevMin
OPTIONAL,   -- Need R
        q-QualMin                                   Q-QualMin
OPTIONAL,   -- Need S
        q-QualMinOffset                             INTEGER (1..8)
OPTIONAL    -- Need S
    }
OPTIONAL,   -- Cond Standalone
    cellAccessRelatedInfo                       CellAccessRelatedInfo,
    connEstFailureControl                       ConnEstFailureControl
OPTIONAL,   -- Need R
    si-SchedulingInfo                           SI-SchedulingInfo
OPTIONAL,   -- Need R
    servingCellConfigCommon                     ServingCellConfigCommonSIB
OPTIONAL,   -- Need R
    ims-EmergencySupport                        ENUMERATED {true}
OPTIONAL,   -- Need R
    eCallOverIMS-Support                        ENUMERATED {true}
OPTIONAL,   -- Cond Absent
    ue-TimersAndConstants                       UE-TimersAndConstants
OPTIONAL,   -- Need R
    uac-BarringInfo                             SEQUENCE {
        uac-BarringForCommon                        UAC-BarringPerCatList
OPTIONAL,   -- Need S
        uac-BarringPerPLMN-List                     UAC-BarringPerPLMN-List
OPTIONAL,   -- Need S
        uac-BarringInfoSetList                      UAC-BarringInfoSetList,
        uac-AccessCategory1-SelectionAssistanceInfo CHOICE {
            plmnCommon                              UAC-AccessCategory1-
SelectionAssistanceInfo,
            individualPLMNList                      SEQUENCE (SIZE
(2..maxPLMN)) OF UAC-AccessCategory1-SelectionAssistanceInfo
        }
OPTIONAL    -- Need S
    }
OPTIONAL,   -- Need R
    useFullResumeID                             ENUMERATED {true}
OPTIONAL,   -- Need R
    lateNonCriticalExtension                    OCTET STRING
OPTIONAL,
    nonCriticalExtension                        SIB1-v1xyz-IEs
OPTIONAL
}
SIB1-v1xyz-IEs ::=              SEQUENCE {
    uac-BarringInfo-MRDC-r1x                    SEQUENCE {
        uac-BarringForCommon                        UAC-BarringPerCatList
OPTIONAL,   -- Need S
        uac-BarringPerPLMN-List                     UAC-BarringPerPLMN-List
OPTIONAL,   -- Need S
        uac-BarringInfoSetList                      UAC-BarringInfoSetList,
        uac-AccessCategory1-SelectionAssistanceInfo CHOICE {
            plmnCommon                              UAC-AccessCategory1-
SelectionAssistanceInfo,
            individualPLMNList                      SEQUENCE (SIZE
(2..maxPLMN)) OF UAC-AccessCategory1-SelectionAssistanceInfo
        }
OPTIONAL    -- Need S
    }
OPTIONAL,   -- Need R
    uac-BarringInfo-NRLight-r1x                 SEQUENCE {
        uac-BarringForCommon                        UAC-BarringPerCatList
OPTIONAL,   -- Need S
        uac-BarringPerPLMN-List                     UAC-BarringPerPLMN-List
OPTIONAL,   -- Need S
```

```
    uac-BarringInfoSetList                       UAC-BarringInfoSetList,
    uac-AccessCategory1-SelectionAssistanceInfo CHOICE {
        plmnCommon                               UAC-AccessCategory1-
SelectionAssistanceInfo,
        individualPLMNList                       SEQUENCE (SIZE
(2..maxPLMN)) OF UAC-AccessCategory1-SelectionAssistanceInfo
    }
OPTIONAL   -- Need S
}
OPTIONAL,   -- Need R
}
UAC-AccessCategory1-SelectionAssistanceInfo ::=   ENUMERATED {a, b, c}
-- TAG-SIB1-STOP
-- ASN1STOP
```

In some embodiments, UAC barring parameters for small data transmission service can be broadcast in an inactive state. Network specific UAC-AccessCategory1-SelectionAssistanceInfo can be broadcast. UAC parameters for neighbor cells/frequencies, secondary cell, secondary cell group, or different UE types can be broadcast. UAC parameters can be broadcast in SIB2, SIB3, SIB4, SIB5 or a new SIB. Unicast UAC parameters can be transmitted via dedicated signaling (e.g. RRCRelease message).

Figure 2:
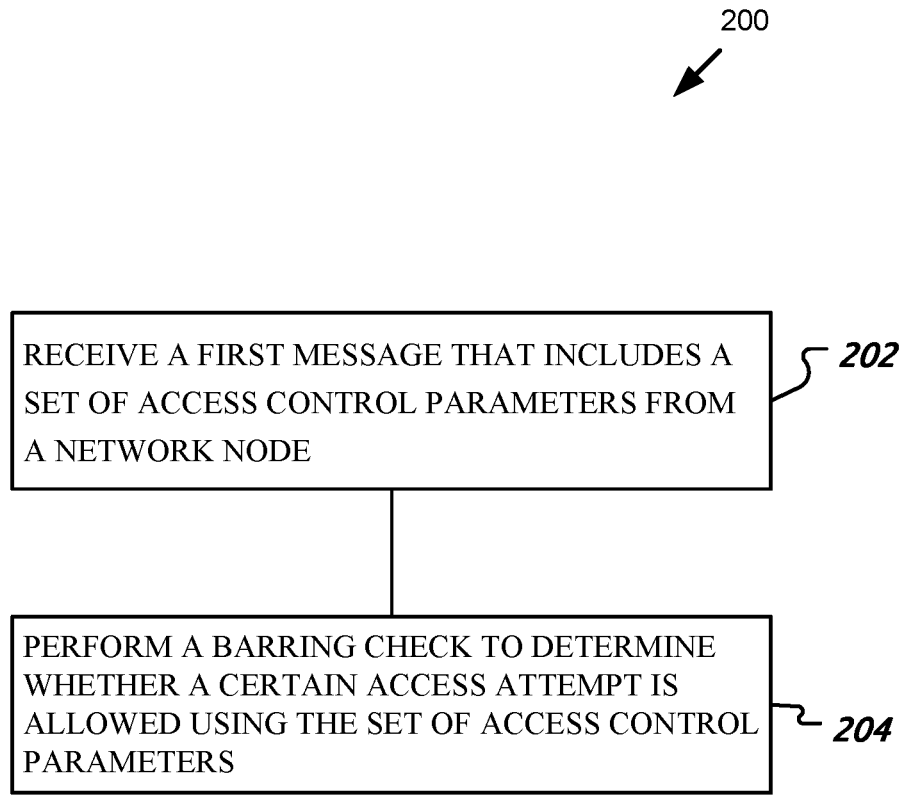
FIG. 2 is a block diagram of an example method for providing UAC parameters to a UE capable of performing a barring check based on the received parameters.

FIG. 2 is a block diagram of an example method 200 for providing UAC parameters to a UE capable of performing a barring check based on the received parameters. The method can include receiving, by a wireless node, a first message that includes a set of access control parameters from a network node (block 202). The set of access control parameters can include UAC parameters as described herein.

The method may also include performing, by the wireless node, a barring check to determine whether a certain access attempt is allowed using the set of access control parameters (block 204).

In some embodiments, the set of access control parameters include UAC parameters that include barring information representative of a listing of access categories with an associated barring information set that is configured for a specific network.

The set of access control parameters can include a list of barring information set (e.g., uac-BarringInfoSetList). In each barring information set, a barring factor, barring time and a bit string (each bit indicates whether the access is allowed for a certain access identity) can be included. The set of access control parameters can include a common barring information (e.g., uac-BarringForCommon) applicable for all the networks (including PLMN or NPN). In this common barring information, a list of access categories with associated barring information set may be included. The set of access control parameters can include a list of barring information for different networks (e.g., uac-BarringPerPLMN-List or uac-BarringPerNPN-List). A list of access categories with associated barring information set may be configured for each network.

In some embodiments, the set of access control parameters are configured for a data transmission service in an inactive state and/or an idle state.

In some embodiments, the data transmission service in the inactive state and/or the idle state is categorized as access category 7, wherein the wireless node performs the barring check using the set of access control parameters associated with the access category 7.

In some embodiments, the data transmission service in the inactive state and/or the idle state is categorized as a new access category, wherein the wireless node performs the barring check using the set of access control parameters associated with the new access category.

In some embodiments, the set of access control parameters include a bit indicative of whether the data transmission in the inactive state and/or the idle state is allowed, wherein the wireless node initiates data transmission in the inactive state and/or the idle state when the bit indicates the service is allowed.

In some embodiments, the data transmission service in the inactive state and/or the idle state is supported by the network node, and wherein the wireless node initiates the small data transmission service without performing the barring check.

In some embodiments, the UAC parameters that include barring information representative of assistance information for access category selection are provided together with an associated network index.

In some embodiments, the UAC parameters that include barring information representative of assistance information for access category selection are provided together with a bitmap.

In some embodiments, a size of the bitmap equals a number of networks sharing a cell, wherein a first bit indicates whether a first network of the number of networks sharing the cell are associated with the barring information representative of the assistance information for access category selection that is configured for the specific network. The leftmost bit can indicate whether the first PLMN in the PLMN-IdentityInfoList or the first NPN in the NPN-IdentityInfoList is associated with UAC-AccessCategory1-SelectionAssistanceInfo or not. If a bit in the bit map is set to "1," it can indicate that the corresponding network is associated with UAC-AccessCategory1-SelectionAssistanceInfo. The first UAC-AccessCategory1-SelectionAssistanceInfo in the list may be associated with the network (a PLMN or a NPN) identified by the first bit with a value of "1." The second UAC-AccessCategory1-SelectionAssistanceInfo in the list may be associated with the network (a PLMN or a NPN) identified by the second bit with a value of "1."

In some embodiments, the UAC parameters that include barring information representative of the assistance information for access category selection that is configured for the specific network are provided in a list of the assistance information for access category selection that is configured for the specific network, wherein a size of the list is equal to a number of networks sharing a cell and each entry inside the list is present.

In some embodiments, the set of access control parameters include a set of parameters for at least one neighboring cell, neighbor frequency or frequency band.

In some embodiments, the set of access control parameters include a set of parameters for a secondary cell or a secondary cell group.

In some embodiments, the set of access control parameters include a set of parameters for an assistant cell, an assistant frequency, or a frequency band, wherein any of the assistant cell, the assistant frequency, and/or assistant frequency band is a cell, frequency, and/or frequency band to be used for the terminal together with a camping cell.

In some embodiments, the method may include selecting, by the wireless node, a neighboring cell, a neighbor frequency, an assistant cell, an assistant frequency, a cell in the assistant cell group, a secondary cell, and/or a cell in the secondary cell group based on determining that the set of access control parameters of a current cell exceeds a threshold level.

In some embodiments, the set of access control parameters include UAC parameters for multiple wireless device types.

In some embodiments, the set of access control parameters include a first subset of parameters for the wireless node that supports Evolved-Universal Terrestrial Radio Access-New Radio Dual Connectivity (EN-DC) communication and a second subset of parameters that are applicable to other types of wireless devices.

In some embodiments, the set of access control parameters include a first subset of parameters for the wireless node that supports Next-Generation Radio Access Network (NG-RAN) Evolved Universal Terrestrial Radio Access New Radio (E-UTRA-NR) Dual Connectivity (NGEN-DC) communication and a second subset of parameters that are applicable to other types of wireless devices.

In some embodiments, the set of access control parameters include a first subset of parameters for the wireless node that supports New Radio E-UTRA Dual Connectivity (NE-DC) communication and a second subset of parameters that are applicable to other types of wireless devices.

In some embodiments, the set of access control parameters include a first subset of parameters for a new radio light terminal, a machine-type communications (MTC) terminal, and/or an internet of things (IoT) terminal.

In some embodiments, the set of access control parameters include a first subset of parameters for the wireless node that supports New Radio Dual Connectivity (NR-DC) communication and a second subset of parameters that are applicable to other types of wireless devices.

In some embodiments, the set of access control parameters include a first subset of parameters for the wireless node that supports Multi-Radio Access Technology Dual Connectivity (MR-DC) communication and a second subset of parameters that are applicable to other types of wireless devices.

In some embodiments, the first subset of parameters for the wireless node include a higher pass rate than a pass rate of the second subset of parameters that are applicable to other types of wireless devices.

In some embodiments, the set of access control parameters are transmitted in a system information block (SIB) in the first message.

In some embodiments, the first message is transmitted via dedicated radio resource control (RRC) signaling. The dedicated RRC message can be a RRCRelease message or a RRCReconfiguration message. Optionally, in a case of multiple UAC parameters are configured in system information, the NW can configure UE with dedicated signaling that which UAC parameters is to be used for UE in IDLE and/or INACTIVE and/or CONNECTED mode. A common configuration can be applied for different mode, or separate configuration can be configured for a different mode.

In another example embodiments, a method for wireless communication includes transmitting, by a network node, a first message that includes a set of access control parameters to a wireless node. The method can also include receiving, by the network node, a second message from the wireless node, the second message transmitted by the wireless node based on a result of a barring check performed by the wireless node to determine whether a certain access attempt is allowed using the set of access control parameters.

In some embodiments, the set of access control parameters are configured for a data transmission service in an inactive state and/or an idle state.

In some embodiments, the data transmission service in the inactive state and/or the idle state is categorized as access category 7, wherein the wireless node is configured to perform the barring check using the set of access control parameters associated with the access category 7.

In some embodiments, the data transmission service in the inactive state and/or the idle state is categorized as a new access category, wherein the wireless node is configured to perform the barring check using the set of access control parameters associated with the new access category.

In some embodiments, the set of access control parameters include a bit indicative of whether the data transmission in the inactive state and/or the idle state is allowed, wherein the wireless node is configured to initiate data transmission in the inactive and/or the idle state responsive to determining that the bit indicates that the data transmission is allowed.

In some embodiments, the data transmission service in the inactive state and/or the idle state is supported by the network node, and wherein the wireless node is configured to initiate the data transmission service without performing the barring check.

In some embodiments, wherein the set of access control parameters include unified access control (UAC) parameters that include barring information representative of assistance information for access category selection are provided together with an associated network index.

In some embodiments, the set of access control parameters include barring information representative of assistance information for access category selection are provided together with a bitmap.

In some embodiments, a size of the bitmap equals a number of networks sharing a cell, wherein a first bit indicates whether a first network of the number of networks sharing the cell are associated with the barring information representative of assistance information for access category selection that is configured for the specific network.

In some embodiments, the set of access control parameters include UAC parameters that include barring information representative of the assistance information for access category selection that is configured for the specific network are provided in a list of the associated barring information set that is configured for the specific network, wherein a size of the list is equal to a number of networks sharing a cell and each entry inside the list is present.

In some embodiments, the set of access control parameters include a set of parameters for any of a neighboring cell, a neighbor frequency, a neighbor frequency band, an assistant cell, an assistant frequency, an assistance frequency band, an assistant cell group, a secondary cell, and a secondary cell group.

In some embodiments, the set of access control parameters include UAC parameters for multiple wireless device types.

In some embodiments, the first message includes the set of access control parameters are transmitted in a system information block (SIB) in the first message.

In some embodiments, the first message is transmitted via dedicated radio resource control (RRC) signaling. The dedicated RRC message can be a RRCRelease message or a RRCReconfiguration message. Optionally, in a case where multiple UAC parameters are configured in system information, the NW configure UE with dedicated signaling that which UAC parameters can be used for UE in IDLE and/or INACTIVE and/or CONNECTED mode. A common configuration can be applied for different mode, or separate configuration can be configured for different mode.

Example Wireless System

Figure 3:
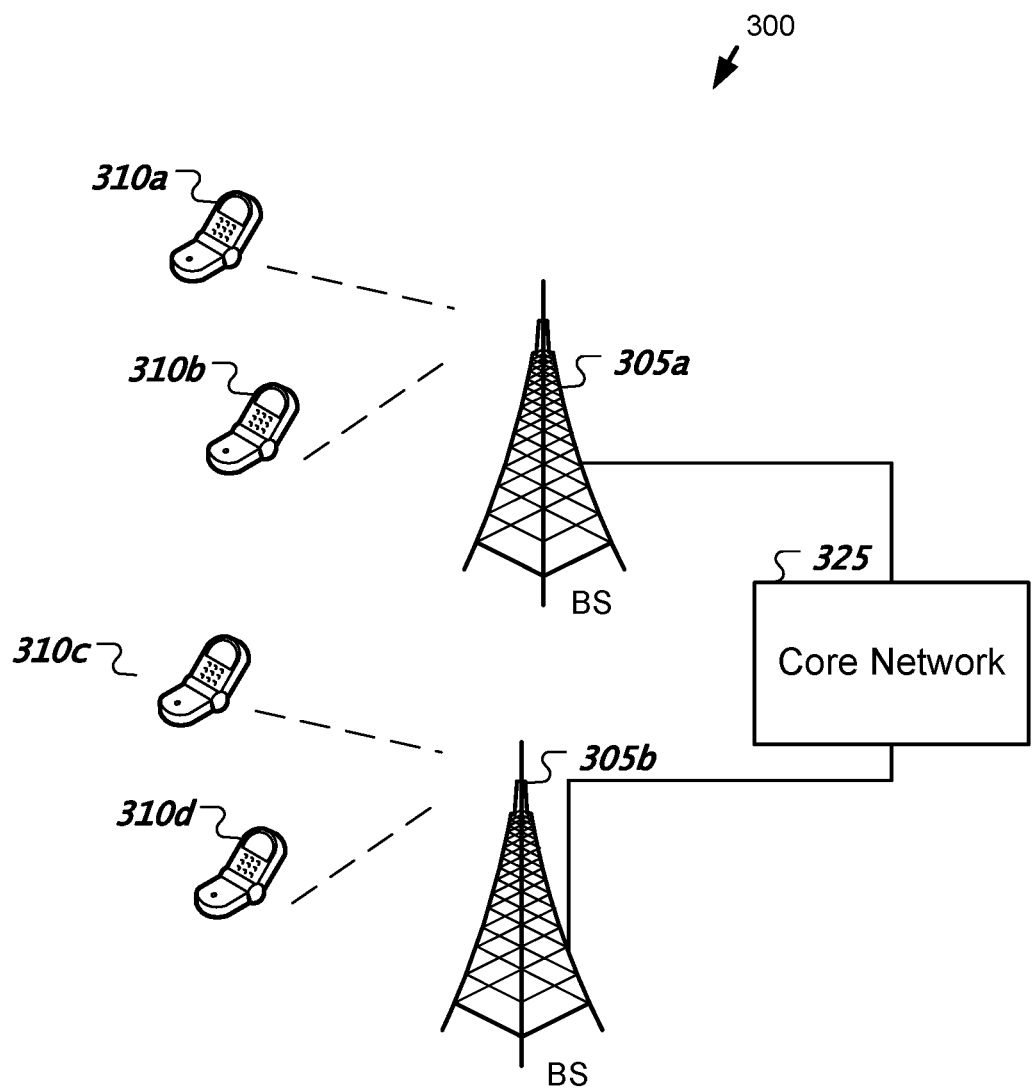
FIG. 3 shows an example of a wireless communication system where techniques in accordance with one or more embodiments of the present technology can be applied.

FIG. 3 shows an example of a wireless communication system where techniques in accordance with one or more embodiments of the present technology can be applied. A wireless communication system 300 can include one or more base stations (BSs) 305a, 305b, one or more wireless devices 310a, 310b, 310c, 310d, and a core network 325. A base station 305a, 305b can provide wireless service to wireless devices 310a, 310b, 310c and 310d in one or more wireless sectors. In some implementations, a base station 305a, 305b includes directional antennas to produce two or more directional beams to provide wireless coverage in different sectors.

The core network 325 can communicate with one or more base stations 305a, 305b. The core network 325 provides connectivity with other wireless communication systems and wired communication systems. The core network may include one or more service subscription databases to store information related to the subscribed wireless devices 310a, 310b, 310c, and 310d. A first base station 305a can provide wireless service based on a first radio access technology, whereas a second base station 305b can provide wireless service based on a second radio access technology. The base stations 305a and 305b may be co-located or may be separately installed in the field according to the deployment scenario. The wireless devices 310a, 310b, 310c, and 310d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 4:
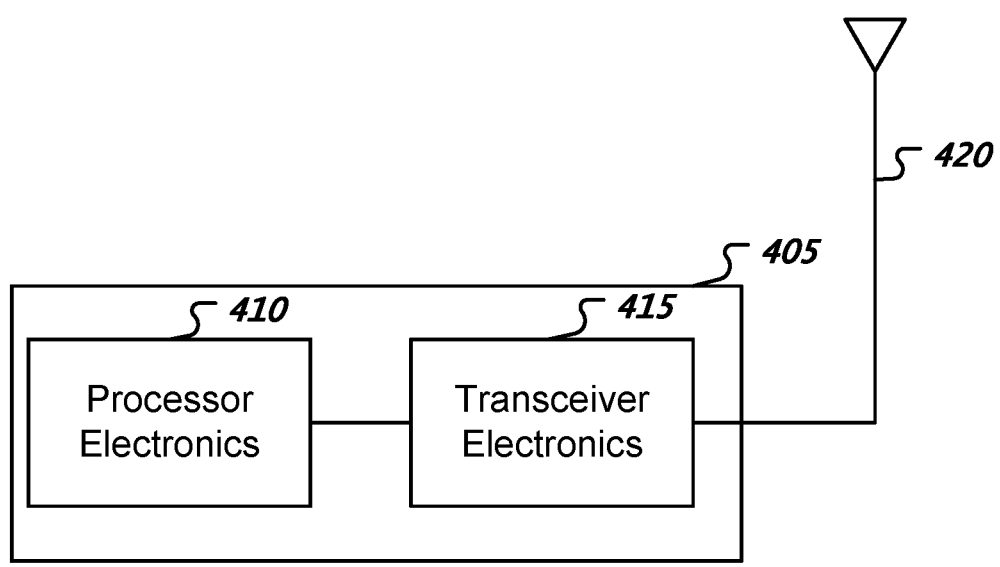
FIG. 4 is a block diagram representation of a portion of a hardware platform.

FIG. 4 is a block diagram representation of a portion of a hardware platform. A hardware platform 405 such as a network device or a base station or a wireless device (or UE) can include processor electronics 410 such as a microprocessor that implements one or more of the techniques presented in this document. The hardware platform 405 can include transceiver electronics 415 to send and/or receive wired or wireless signals over one or more communication interfaces such as antenna 420 or a wireline interface. The hardware platform 405 can implement other communication interfaces with defined protocols for transmitting and receiving data. The hardware platform 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the hardware platform 405.

CONCLUSION

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
  receiving, by a wireless node, a first message that includes a set of access control parameters from a network node, the set of access control parameters comprising unified access control (UAC) parameters that include a listing of access categories and a corresponding barring information set, the set of access control parameters further comprising a list of assistance information for access category selection for a number of networks sharing a cell,
  wherein a size of the list of assistance information for access category selection is equal to the number of networks sharing the cell,
  wherein each entry of the list of assistance information for access category selection is associated with a corresponding network in the number of networks sharing the cell, and
  wherein a value of an entry of the list of assistance information for access category selection corresponds to Access Category 1 not being configured for the corresponding network; and
  performing, by the wireless node, an access barring check to determine whether a certain access attempt is allowed using the set of access control parameters.

2. The method of claim 1, wherein each entry inside the list of assistance information for access category selection is present.

3. The method of claim 1, wherein the set of access control parameters is in a system information block (SIB) message.

4. A method for wireless communication, comprising:
  transmitting, by a network node, a first message that includes a set of access control parameters to a wireless node, the set of access control parameters comprising unified access control (UAC) parameters that include a listing of access categories and a corresponding barring information set, the set of access control parameters further comprising a list of assistance information for access category selection for a number of networks sharing a cell,
  wherein a size of the list of assistance information for access category selection is equal to the number of networks sharing the cell,
  wherein each entry of the list of assistance information for access category selection is associated with a corresponding network in the number of networks sharing the cell, and
  wherein a value of an entry of the list of assistance information for access category selection corresponds to Access Category 1 not being configured for the corresponding network; and
  receiving, by the network node, a second message from the wireless node based on a result of an access barring check performed by the wireless node to determine whether a certain access attempt is allowed using the set of access control parameters.

5. The method of claim 4, wherein each entry inside the list of assistance information for access category selection is present.

6. The method of claim 4, wherein the set of access control parameters is in a system information block (SIB) message.

7. An apparatus for wireless communication comprising a processor that is configured to:
  receive a first message that includes a set of access control parameters from a network node, the set of access control parameters comprising unified access control (UAC) parameters that include a listing of access categories and a corresponding barring information set, the set of access control parameters further comprising a list of assistance information for access category selection for a number of networks sharing a cell,
  wherein a size of the list of assistance information for access category selection is equal to the number of networks sharing the cell,
  wherein each entry of the list of assistance information for access category selection is associated with a corresponding network in the number of networks sharing the cell, and
  wherein a value of an entry of the list of assistance information for access category selection corresponds to Access Category 1 not being configured for the corresponding network; and
  perform an access barring check to determine whether a certain access attempt is allowed using the set of access control parameters.

8. The apparatus of claim 7, wherein each entry inside the list of assistance information for access category selection is present.

9. The apparatus of claim 7, wherein the set of access control parameters is in a system information block (SIB) message.

10. An apparatus for wireless communication comprising a processor that is configured to:
   transmit a first message that includes a set of access control parameters to a wireless node, the set of access control parameters comprising unified access control (UAC) parameters that include a listing of access categories and a corresponding barring information set, the set of access control parameters further comprising a list of assistance information for access category selection for a number of networks sharing a cell,
   wherein a size of the list of assistance information for access category selection is equal to the number of networks sharing the cell,
   wherein each entry of the list of assistance information for access category selection is associated with a corresponding network in the number of networks sharing the cell, and
   wherein a value of an entry of the list of assistance information for access category selection corresponds to Access Category 1 not being configured for the corresponding network; and
   receive a second message from the wireless node based on a result of an access barring check performed by the wireless node to determine whether a certain access attempt is allowed using the set of access control parameters.

11. The apparatus of claim 10, wherein each entry inside the list of assistance information for access category selection is present.

12. The apparatus of claim 10, wherein the set of access control parameters is in a system information block (SIB) message.

* * * * *